(12) United States Patent
Tempel

(10) Patent No.: US 11,054,844 B2
(45) Date of Patent: Jul. 6, 2021

(54) SANITARY INSERT PART AND USE OF SUCH AN INSERT PART

(71) Applicant: Neoperl GmbH, Mullheim (DE)

(72) Inventor: Marc Tempel, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 16/478,280

(22) PCT Filed: Jan. 9, 2018

(86) PCT No.: PCT/EP2018/050422
§ 371 (c)(1),
(2) Date: Jul. 16, 2019

(87) PCT Pub. No.: WO2018/162121
PCT Pub. Date: Sep. 13, 2018

(65) Prior Publication Data
US 2019/0384327 A1 Dec. 19, 2019

(30) Foreign Application Priority Data
Mar. 10, 2017 (DE) .......................... 202017101398.7

(51) Int. Cl.
*F15D 1/02* (2006.01)
*G05D 7/01* (2006.01)
*E03C 1/02* (2006.01)

(52) U.S. Cl.
CPC .............. *G05D 7/012* (2013.01); *E03C 1/02* (2013.01); *E03C 2001/026* (2013.01)

(58) Field of Classification Search
CPC ..... G05D 7/012; E03C 1/02; E03C 2001/026; F15D 1/025

USPC ............................................... 138/42, 43, 46
See application file for complete search history.

(56) References Cited

U.S. PATENT DOCUMENTS

| | | | | |
|---|---|---|---|---|
| 2,769,454 A | * | 11/1956 | Bletcher | G05D 7/012 137/119.04 |
| 3,216,451 A | * | 11/1965 | Smallpeice Cosby | G05D 7/012 137/861 |
| 3,847,178 A | * | 11/1974 | Keppel | F16K 1/465 137/515.7 |

(Continued)

FOREIGN PATENT DOCUMENTS

| | | |
|---|---|---|
| CN | 202298777 | 7/2012 |
| CN | 104956007 | 9/2015 |

(Continued)

*Primary Examiner* — James F Hook
(74) *Attorney, Agent, or Firm* — Volpe Koenig

(57) ABSTRACT

A sanitary insert part (1), including a main body (2) which provides a radially oriented outer surface (3), and an elastic regulating body (4), wherein the base body (2) forms a regulating core (5) having a regulating profile (6) and a regulating gap (7) is formed between the regulating body (4) and the regulating profile (6), such that an opening cross section (8) of the regulating gap (7) can be varied by a pressure-dependent loading of the regulating body (4), characterized in that the main body (2) forms a radially outwardly open receptacle (9), the regulating body (4) is arranged in the receptacle (9), and an external diameter (10) of the regulating body (2) is matched to an outer diameter (11) of the outer surface (3).

17 Claims, 3 Drawing Sheets

(56) References Cited

U.S. PATENT DOCUMENTS

| | | | | |
|---|---|---|---|---|
| 4,411,292 | A * | 10/1983 | Schiller | F16K 1/40 |
| | | | | 138/42 |
| 4,760,957 | A * | 8/1988 | Rosenberg | B05B 1/265 |
| | | | | 138/43 |
| 5,890,518 | A * | 4/1999 | Fischerkeller | G05D 16/02 |
| | | | | 123/514 |
| 5,899,224 | A * | 5/1999 | Moldenhauer | G05D 7/012 |
| | | | | 137/517 |
| 6,311,712 | B1 * | 11/2001 | Meyer | G05D 7/0146 |
| | | | | 137/271 |
| 8,230,884 | B2 * | 7/2012 | Bereznai | F16K 21/02 |
| | | | | 138/46 |
| 9,639,095 | B2 | 5/2017 | Schurle et al. | |
| 10,077,545 | B2 * | 9/2018 | Lin | E03C 1/08 |
| 2006/0169330 | A1 * | 8/2006 | Hart | G05D 7/012 |
| | | | | 137/512.15 |
| 2014/0014216 | A1 * | 1/2014 | Tsai | F16K 47/02 |
| | | | | 138/39 |

FOREIGN PATENT DOCUMENTS

| | | |
|---|---|---|
| DE | 10311501 | 10/2004 |
| DE | 102015003065 | 9/2016 |
| FR | 2929629 | 10/2009 |

* cited by examiner

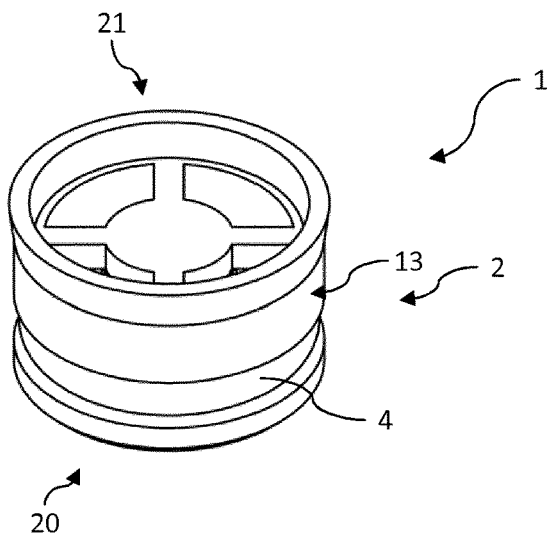
Fig. 1
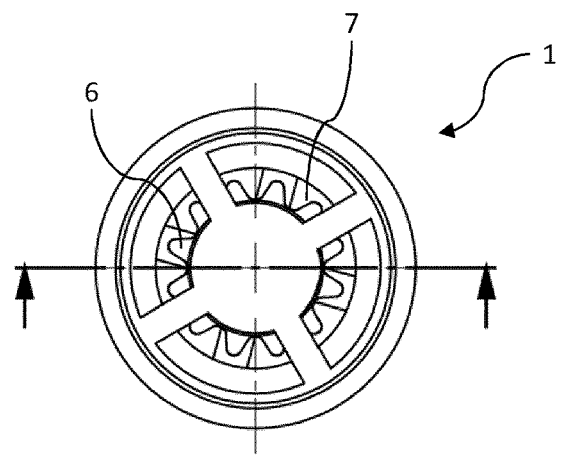
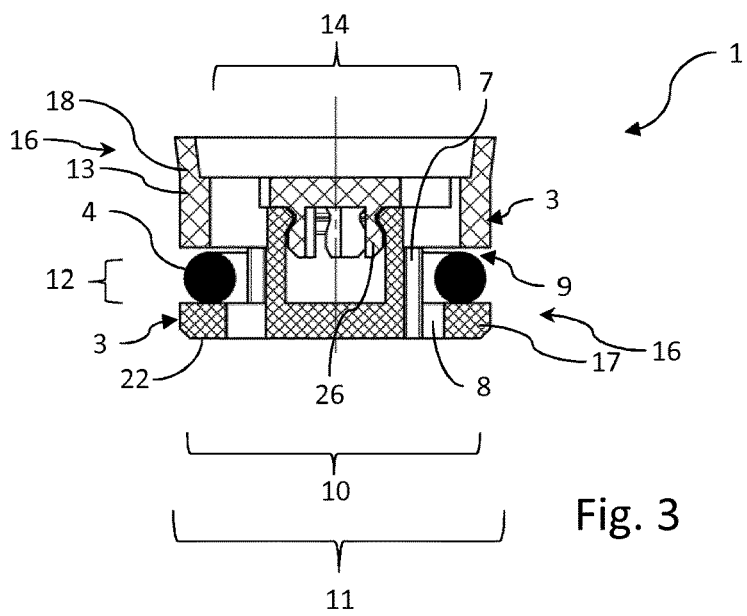
Fig. 2
Fig. 3

SANITARY INSERT PART AND USE OF SUCH AN INSERT PART

BACKGROUND

The invention relates to a sanitary insert part, having a main body which provides a radially oriented outer surface, and an elastic regulating body, wherein the main body forms a regulator core with a regulating profile, and a regulating gap is formed between the regulating body and the regulating profile such that an opening cross section of the regulating gap can be varied by a pressure-dependent loading of the regulating body.

The invention furthermore relates to the use of a sanitary insert part.

Insert parts of this type are known and are used, for example, as flow regulators in order to realize a desired flow rate per unit of time independently of pressure in a working region.

SUMMARY

The invention is based on the object of providing a flow regulator having as small an outer size as possible.

This object is achieved by a flow regulator having one or more features according to the invention. In particular, it is therefore provided according to the invention in order to achieve the stated object in a flow regulator of the type described at the beginning that the main body forms a radially outwardly open receptacle, in that the regulating body is arranged in the receptacle, and in that an outer diameter of the regulating body is matched to an outer diameter of the outer surface.

A wall is therefore not required on the outer side of the regulating body, and the construction space necessary for this purpose can be saved. The flow regulator according to the invention can therefore be manufactured with a radial outer dimension which is substantially determined by the regulating body. This additionally avoids disadvantageous influences on a regulating behavior that would arise from an otherwise required miniaturization of the regulating body.

The configuration according to the invention of the receptacle therefore makes it possible for the regulating body to be accessible radially from the outside, preferably on all sides, when the insert body is not installed.

The terms "radially", "axially" and "circumference", unless stated otherwise, can be understood with respect to a longitudinal axis of the flow regulator, said longitudinal axis being able to coincide with a general direction of flow.

In a refinement of the invention, it can be provided that the outer diameter of the regulating body is smaller than the outer diameter of the outer surface. It is favorable in this connection if the regulating body has an outer diameter which is substantially identical to the outer diameter of the outer surface, but does not protrude over the outer surface. The outer diameter of the regulating body is preferably at most 20% smaller, particularly preferably at most 10% smaller, than the outer diameter of the outer surface. An available construction space can therefore be used for as large a regulating body as possible.

In one refinement of the invention, it can be provided that the receptacle is designed to be radially outwardly open in an axial portion taken up by the regulating body. An arrangement is thus created in which no components are provided between the regulating body and an inner wall of a tubular portion, the inner wall surrounding or receiving the flow regulator. The flow regulator can therefore be arranged as close as possible to said inner wall. A use of the space of an available inner cross section by the regulating body can therefore be improved.

In one refinement of the invention, it can be provided that the outer surface is formed on a wall of the main body, wherein the outer diameter of the regulating body is larger than an inner diameter of the wall. The effect can therefore be achieved that a radially outermost point of the regulating body projects beyond an inner boundary of the wall. A wall thickness of the wall can therefore also be used for dimensioning the regulating body, and therefore as large a radius of curvature as possible of the regulating body in the circumferential direction can be achieved. This results in a particularly advantageous regulating behavior.

In one refinement of the invention, it can be provided that the outer diameter of the outer surface defines a maximum radial outer dimension of the main body. It is of advantage here that no space is wasted in the interior of the receiving tubular portion. On the contrary, all of the available inner cross section of the portion can be used in order to be able to use as large a regulating body as possible, that is to say a regulating body having, for example, as large an outer diameter as possible.

The outer surface can be formed here cylindrically or in another manner, for example in a free form. The outer diameter can be defined here by the regions lying furthest radially on the outside.

In one refinement of the invention, it can be provided that a sealing element which is deformable radially inwards is formed adjacent to the outer surface. Sealing and/or axial holding in a tubular portion can therefore be achieved in a manner which is simple structurally and in terms of manufacturing. The sealing element is preferably deformable at least as far as the outer diameter of the outer surface. Unnecessary clearances between the outer surface and the tubular portion can thus be avoided. The elastic deformability has the further advantage that manufacturing tolerances or diameter fluctuations of the tubular portion can be compensated for. It is particularly favorable if the sealing element is designed as an integrally formed, preferably encircling, sealing lip. The sealing element can therefore be easily formed integrally with the housing and can preferably take on sealing functions and/or holding functions on all sides.

In one refinement of the invention, it can be provided that the cross section of the main body has a round main shape. The flow regulator can therefore be used, for example, in standardized water outlets and/or pipe systems without additional adaptation measures.

In one refinement of the invention, it can be provided that the regulating body is formed annularly. It is therefore possible to dispense with ends, which would possibly have to be fixed, on the regulating body. The regulating body is preferably in the form of an O ring. An available standard component can therefore be used.

In one refinement of the invention, it can be provided that the main body is assembled from at least two parts, in particular wherein the at least two parts are connected to one another in a form-fitting, force-fitting and/or integrally bonded manner and/or so as not to be releasable without being destroyed. The regulating body, in particular if it is annular, can therefore be simply placed between the parts and held there in its use position.

Alternatively or additionally, it can be provided that the main body is formed integrally. Installation can therefore be simplified. In particular in this connection, the receptacle can be designed to be at least partially open axially on one side. The regulating body which has already been described can therefore be simply placed into the receptacle. The inserted regulating body can be secured here axially by a holding element. Protection against falling out can therefore be formed, which simplifies the installation of the insert part at the point of use.

In one refinement of the invention, it can be provided that a connecting portion between the at least two parts reaches through the regulating body. The regulating body can therefore be held simply in the radial direction.

In one refinement of the invention, it can be provided that the at least two parts with their outer dimensions describe a common cylinder surface. A constant inner diameter of a tubular portion can therefore be readily used.

In one refinement of the invention, it can be provided that an at least partially axially acting sealing surface is formed on an outflow side. It is of advantage here that a liquid exit through the receptacle and a bypassing of the quantity regulation can be avoided in a simple manner. The sealing surface is preferably completely oriented radially, i.e., for example, has a surface normal which is oriented parallel to the longitudinal axis of the insert part and/or to the insertion direction of the insert part. The sealing surface can therefore be designed, for example, as a circular disk, through the opening of which the quantity-regulated water flows. However, conical sealing surfaces or in general sealing surfaces describing a tapering can also be formed, in which only one part, i.e. a component, a contact pressure force, is oriented axially.

In one refinement of the invention, it can be provided that an outer diameter of the outer surface, in particular the outer diameter already mentioned, is at most 8 mm. Very small flow regulators exhibiting a good regulating behavior can therefore be manufactured. It is particularly favorable if the outer diameter is at most 6 mm. Particularly small installation dimensions can therefore be achieved.

The object set out is alternatively or additionally achieved according to a method of use having one or more features of the invention. In particular, in order to achieve the stated object, the use of a sanitary insert part according to the invention, in particular as described above and/or as claimed in one of the claims directed toward an insert part, is therefore provided, wherein the insert part is inserted into a tubular portion, wherein an inner wall of the tubular closure serves as the radially outer closure of the receptacle of the regulating body. In the installation situation, the receptacle in which the regulating body is arranged, is therefore closed radially on the outer side by the receiving tubular portion. An additional construction space for a radial closure around the regulating body by a housing of the insert part, which would radially enlarge the insert part or would require a disadvantageous reduction in size of the regulating body, can therefore be avoided. The receiving tubular portion can therefore take on a housing-forming function in order to close the regulating body.

In one refinement of the invention, it can be provided that an at least partially axially acting sealing surface, in particular the sealing surface which has already been mentioned, provides a seal between the insert part and the tubular portion on the outflow side with respect to the receptacle. It is of advantage here that an outer flow past the regulating gap, which would unfavorably impair the regulating behavior, can be avoided. In particular, it can be provided here that the sealing surface lies against a radially inwardly protruding collar on the tubular portion. The tubular portion can therefore be provided with a collar which keeps the insert part in its place in the portion even in the event of high pressures. An automatic reinforcement of the sealing on the sealing surface can therefore be achieved.

BRIEF DESCRIPTION OF THE DRAWINGS

The invention will now be described in more detail with reference to an exemplary embodiment, but is not limited to the exemplary embodiment. Further exemplary embodiments emerge from a combination of the features of individual claims or a plurality of claims with one another and/or with individual features or a plurality of features of the exemplary embodiment.

In the figures:

FIG. 1 shows a sanitary insert part according to the invention in a three-dimensional oblique view from the outside, FIG. 2 shows the insert part according to FIG. 1 in a top view of an inflow side, FIG. 3 shows the insert part according to FIGS. 1 and 2 in a longitudinal section.

DETAILED DESCRIPTION

Figure 4:
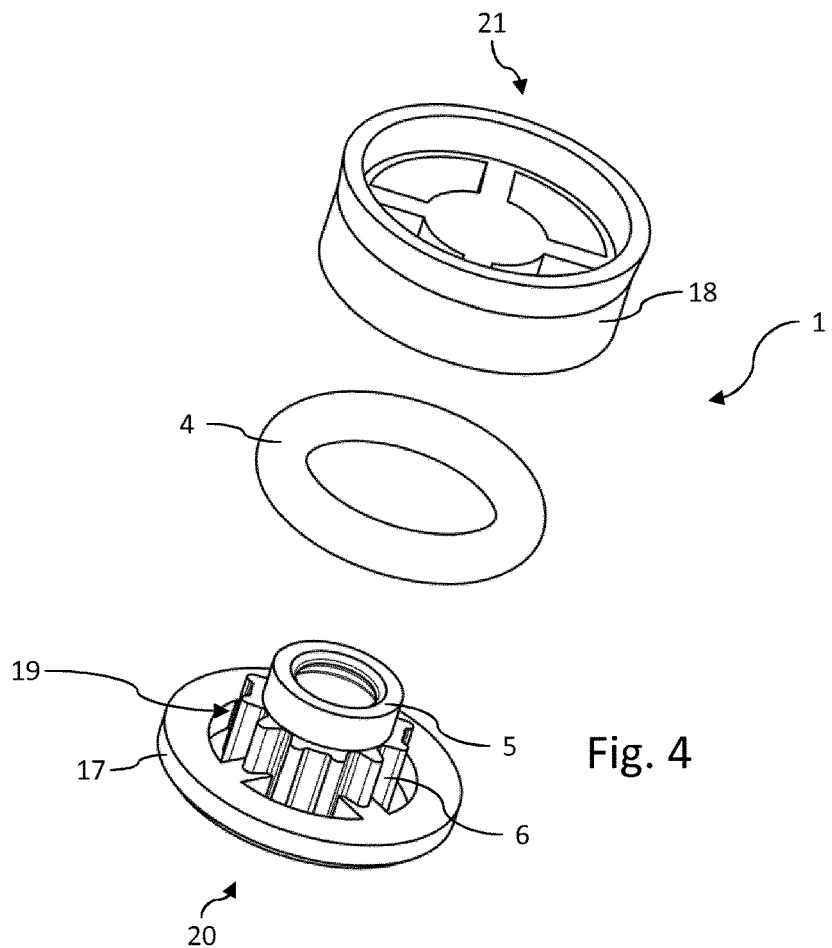
FIG. 4 shows the insert part according to FIGS. 1 to 3 in an exploded illustration.

FIGS. 1 to 4 show a sanitary insert part 1 according to the invention in various illustrations. The insert part 1 has a substantially cylindrical main body 2 which has a radially oriented outer surface 3. The main body 2 furthermore has an encircling receptacle 9 into which an approximately O-ring-shaped regulating body 4 is inserted. The receptacle 9 is designed to be radially outwardly open at least in an axial portion 12 taken up by the regulating body 4.

The outer diameter 10 of the regulating body 4 is matched here to the outer diameter 11 of the outer surface 3. This means that the outer diameter 10 of the regulating body 4 is preferably smaller than the outer diameter 11 of the outer surface. In particular smaller by at most 20%, preferably at most 10%, i.e. as close as possible to, but below, the outer diameter of the regulating body 2.

The insert part 1 has an inflow side 21 through which water flows into the insert part 1, and an outflow side 20 through which water exits again.

As can be seen in particular in FIG. 3, the main body 2 has a regulator core 5 which is arranged coaxially in the center of the main body 2. The regulator core 5 has, radially on the outside, a regulator profile 6 which, together with the regulating body 4 arranged coaxially with respect to said regulator profile 6, defines a regulating gap 7.

The regulating body 4 is comprised of an elastic material, and therefore the opening cross section 8 of the regulating gap 7 can be changed by a pressure-dependent loading of the regulating body 4.

In the example, the main body 2 is of two-part design, and therefore installation can take place more simply. In particular, the two parts can be connected in a form-fitting, force-fitting and/or integrally bonded manner, i.e. in general so as not to be releasable without being destroyed. The regulating body 4, in particular if it is annular, can therefore be simply placed between the parts and held there in its use position. In the example, a first part 17 is connected to a second part 18 via a connecting portion 19 which reaches axially through the regulating body 5. The second part 18 here has latching elements 26 which engage in the first part 17 and therefore produce a releasable connection. Alternatively or additionally, the latching elements 26 can be formed on the first part 17.

The outer surface 3 which has already been described can be formed here on the first part 17 and/or the second part 18. In the present exemplary embodiment, the two outer surfaces 3 are aligned and therefore form a common, two-part outer surface 3 with a shape of a cylinder surface.

Figure 5:
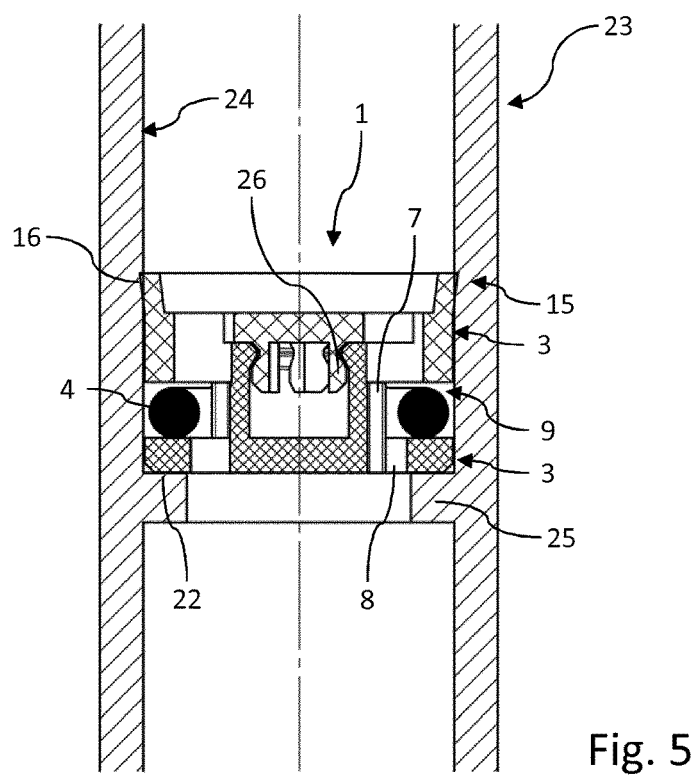
FIG. 5 shows an installation situation of the insert part according to FIGS. 1 to 4 in a tubular portion for explaining the use according to the invention.

In FIG. 5, a sanitary insert part 1 according to the invention has now been inserted into a tubular portion 23. The inner wall 24 of the tubular portion 23 serves as a radially outer closure of the receptacle 9 of the regulating body 4. In the installation situation, the receptacle 9 in which the regulating body 4 is arranged is therefore closed radially on the outer side by the receiving tubular portion 23. An additional construction space for a radial closure around the regulating body 4 by a housing of the insert part 1, which would radially enlarge the insert part 1 or would require a disadvantageous reduction in size of the regulating body 4, can therefore be avoided. The receiving tubular portion 23 therefore takes on a housing-forming function for the closure of the regulating body 4. In practice, the tubular portion 23 is, for example, part of a sanitary fitting, a pipe system or the like.

In the example, the tubular portion 23 has a partially axially acting sealing surface 22 which provides a seal between the insert part 1 and the tubular portion 23 on the outflow side with respect to the receptacle 9. It is of advantage here that flow on the outer side past the regulating gap 7, which would unfavorably impair the regulating behavior, can be avoided. In particular, it can be provided here that the sealing surface 22 lies against a radially inwardly protruding collar 25 on the tubular portion 23. The collar 25 keeps the insert part 1 in its place in the portion 23 even in the event of high pressures. An automatic reinforcement of the sealing at the sealing surface 22 can therefore be achieved.

On the inflow side 21, the insert part 1 has a sealing element 15 which also prevents flow on the outer side past the regulating gap 7 on the inflow side 21. The sealing element 15 is formed by a sealing lip 16 which protrudes radially over the outer surface 3 and interacts with the inner diameter 14 of the portion 23.

Figure 6:
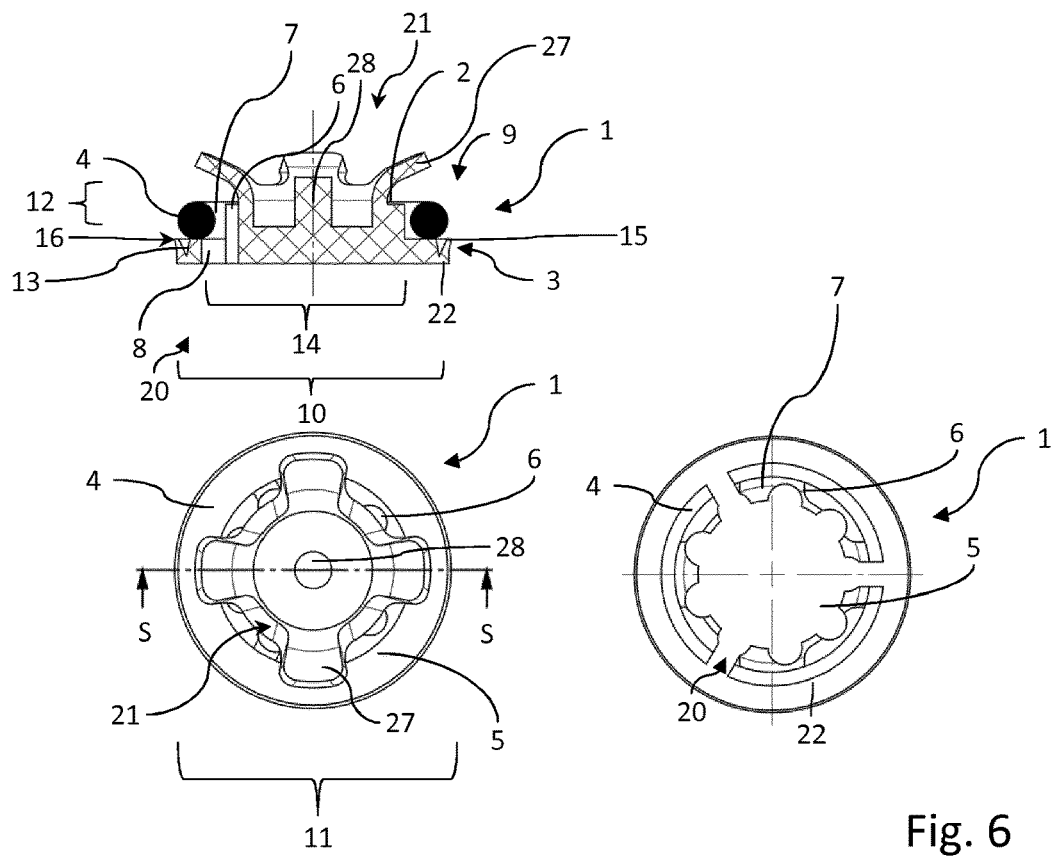
FIG. 6 shows three views of a further insert part according to the invention.

FIG. 6 shows, at the bottom on the right in the clockwise direction, a view from below, i.e. of the outflow side 20, at the bottom on the left a view from above, i.e. of the inflow side 21, and at the top on the left an axial section along the intersecting plane S-S. Components and functional units which are identical or similar structurally and/or functionally to the preceding exemplary embodiments are denoted by the same reference signs and are not described once again separately. The statements with regard to FIGS. 1 to 5 therefore apply correspondingly to FIG. 6. In particular, the insert part according to FIG. 6 can be placed into the tubular portion 23 of FIG. 5.

The exemplary embodiment according to FIG. 6 differs from the preceding exemplary embodiment at least in that the main body 3 is formed in one part or integrally and that the receptacle 9 is partially open on one side in the axial direction, in particular counter to a direction of flow.

Instead of the latching elements 26, the main body 2 has holding elements 27 which—as here in the example—can be tongue-shaped and which axially secure the regulating body 4 by, for example, extending through and behind the latter, as shown.

The sealing element 15 already described with respect to the preceding exemplary embodiment—also designed here by way of example as an encircling sealing lip 16—is arranged here at the outflow-side end of the main body 2, i.e. behind the regulating body 4 in the direction of flow. The sealing element provides a seal and securely holds the main body 3 in the tubular portion 23 against falling out counter to the direction of flow. Via a here by way of example pin-shaped removal element 28, the insert part 1 can be inserted and/or can be removed with a tool, for example with pliers.

The outer surface 3 is therefore designed as a simple, cohesive cylinder surface area below the receptacle 9.

Figure 7:
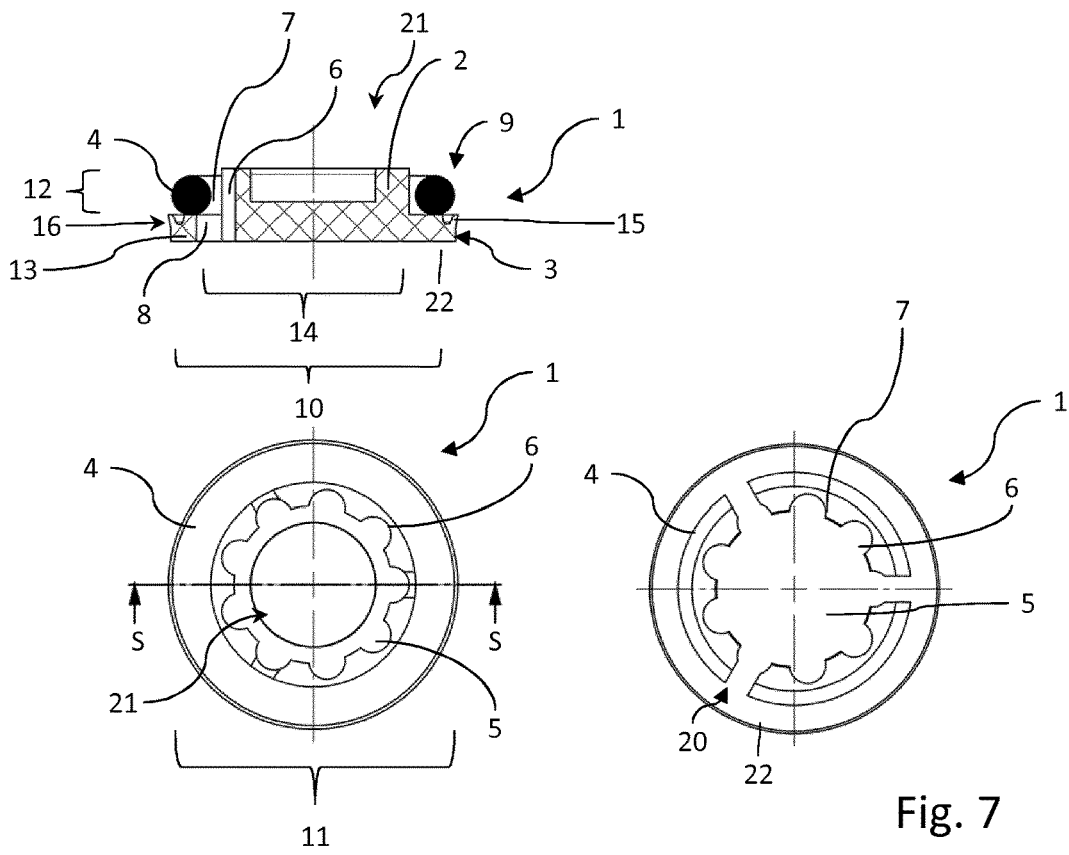
FIG. 7 shows three views of a further insert part according to the invention.

FIG. 7 shows at the bottom on the right in the clockwise direction a view from below, i.e. of the outflow side 20, at the bottom on the left a view from above, i.e. of the inflow side 21, and at the top on the left an axial section along the intersecting plane S-S. Components and functional units which are identical or similar structurally and/or functionally to the preceding exemplary embodiments are denoted by the same reference signs and are not described once again separately. The explanations with regard to FIGS. 1 to 6 therefore apply correspondingly to FIG. 7. In particular, the insert part according to FIG. 7 can be placed into the tubular portion 23 of FIG. 5.

Also in this exemplary embodiment, the main body 3 is formed as a single part or integrally. The receptacle 9 is now completely formed so as to be open on one side in the axial direction such that the regulating body 4 can simply be inserted into the receptacle 9.

The regulating body 4—and possibly also the main body 3—is/are secured axially here in another manner, for example by means (not illustrated specifically) in the tubular portion 23, such as a securing ring, a securing nut, radial screws or pins or the like.

LIST OF REFERENCE SIGNS

1 Sanitary insert part
2 Main body
3 Outer surface
4 Regulating body
5 Regulator core
6 Regulating profile
7 Regulating gap
8 Opening cross section
9 Receptacle
10 Outer diameter of the regulating body
11 Outer diameter of the outer surface
12 Axial portion
13 Wall
14 Inner diameter
15 Sealing element
16 Sealing lip
17 First part
18 Second part
19 Connecting portion
20 Outflow side
21 Inflow side
22 Sealing surface
23 Tubular portion
24 Inner wall
25 Collar
26 Latching element 27 Holding element
28 Removal element

The invention claimed is:

1. A sanitary insert part (1), comprising:
a main body (2) which provides a radially oriented outer surface (3), and forming a regulator core (5) with a regulating profile (6);
an elastic regulating body (4);
a sealing element (15), which is elastically deformable radially inward, adjacent to the outer surface (3);
a regulating gap (7) formed between the regulating body (4) and the regulating profile (6) such that an opening cross section (8) of the regulating gap (7) is variable by a pressure-dependent loading of the regulating body (4);
the main body (2) forms a radially outwardly open receptacle (9), the regulating body (4) is arranged in the receptacle (9), and an outer diameter (10) of the regulating body (2) is matched to an outer diameter (11) of the outer surface (3).

2. The sanitary insert part (1) as claimed in claim 1, wherein the outer diameter (10) of the regulating body (4) is smaller than the outer diameter (11) of the outer surface (3).

3. The sanitary insert part (1) as claimed in claim 1, wherein the receptacle (9) is radially outwardly open in an axial portion (12) taken up by the regulating body (4).

4. The sanitary insert part (1) as claimed in claim 1, wherein the outer surface (3) is formed on a wall (13) of the main body (2), and the outer diameter (10) of the regulating body (4) is larger than an inner diameter (14) of the wall.

5. The sanitary insert part (1) as claimed in claim 1, wherein the outer diameter (11) of the outer surface (3) defines a maximum radial outer dimension of the main body (2).

6. The sanitary insert part (1) as claimed in claim 1, wherein a cross section of the main body (2) has a round main shape.

7. The sanitary insert part (1) as claimed in claim 1, wherein the regulating body (4) is annular.

8. The sanitary insert part (1) as claimed in claim 1, wherein the main body (2) is assembled from at least two parts (17, 18) that are connected to one another in at least one of a form-fitting, force-fitting, or integrally bonded manner so as not to be releasable without being destroyed.

9. The sanitary insert part (1) as claimed in claim 8, further comprising a connecting portion (19) between the at least two parts (17, 18) that extends through the regulating body (5).

10. The sanitary insert part (1) as claimed in claim 8, wherein the at least two parts (17, 18) have outer dimensions that describe a common cylinder surface.

11. The sanitary insert part (1) as claimed in claim 1, further comprising an at least partially axially acting sealing surface (22) formed on an outflow side (20).

12. The sanitary insert part (1) as claimed in claim 1, wherein an outer diameter (11) of the outer surface (3) is 8 mm or less.

13. A method of controlling a flow, comprising:
inserting the sanitary insert part as claimed in claim 1, into a tubular portion (23) that carries a water flow, and
forming a radially outer closure of the receptacle (9) of the regulating body (4) using an inner wall (24) of the tubular portion (23).

14. The method as claimed in claim 13, further comprising sealing the outflow side with an at least partially axially acting sealing surface (22) between the insert part (1) and the tubular portion (23) provides a seal on the outflow side with respect to the receptacle (9), with the sealing surface (22) lying against a radially inwardly protruding collar (25) on the tubular portion (23).

15. The sanitary insert part (1) as claimed in claim 1, wherein the outer diameter (10) of the regulating body (4) is at most 20% smaller than the outer diameter (11) of the outer surface (3).

16. The sanitary insert part (1) as claimed in claim 1, wherein the sealing element (15) comprises an integrally formed sealing lip (16).

17. The sanitary insert part (1) as claimed in claim 1, wherein the main body (2) is formed integrally, with the receptacle (9) being at least partially open axially on an end side.

* * * * *